United States Patent
Kwon et al.

(10) Patent No.: US 10,430,339 B2
(45) Date of Patent: Oct. 1, 2019

(54) MEMORY MANAGEMENT METHOD AND APPARATUS

(71) Applicant: SAMSUNG ELECTRONICS CO., LTD., Suwon-si (KR)

(72) Inventors: Ki-seok Kwon, Seoul (KR); Chul-soo Park, Seoul (KR); Suk-jin Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 211 days.

(21) Appl. No.: 15/107,255

(22) PCT Filed: Dec. 30, 2014

(86) PCT No.: PCT/KR2014/013009
§ 371 (c)(1),
(2) Date: Jun. 22, 2016

(87) PCT Pub. No.: WO2015/102352
PCT Pub. Date: Jul. 9, 2015

(65) Prior Publication Data
US 2016/0335185 A1 Nov. 17, 2016

(30) Foreign Application Priority Data
Dec. 31, 2013 (KR) .................. 10-2013-0168833

(51) Int. Cl.
*G06F 12/0846* (2016.01)
*G06F 12/0815* (2016.01)
(Continued)

(52) U.S. Cl.
CPC ...... *G06F 12/0851* (2013.01); *G06F 12/0207* (2013.01); *G06F 12/0815* (2013.01);
(Continued)

(58) Field of Classification Search
CPC ............ G06F 12/0851; G06F 12/0207; G06F 12/0815; G06F 12/0886; G06F 2212/621; Y02B 60/1225
See application file for complete search history.

(56) References Cited

U.S. PATENT DOCUMENTS

| | | |
|---|---|---|
| 4,888,679 A | 12/1989 | Fossum et al. |
| 4,918,600 A | 4/1990 | Harper, III et al. |

(Continued)

FOREIGN PATENT DOCUMENTS

| | | |
|---|---|---|
| CN | 101558391 B | 10/2013 |
| EP | 1936628 A1 | 6/2008 |

(Continued)

OTHER PUBLICATIONS

International Search Report and Written Opinion, issued by International Searching Authority in corresponding International Application No. PCT/KR2014/013009, dated Apr. 6, 2015. (PCT/ISA/220, PCT/ISA/210 & PCT/ISA/237).

(Continued)

*Primary Examiner* — Gurtej Bansal
(74) *Attorney, Agent, or Firm* — Sughrue Mion, PLLC (57) ABSTRACT

A memory management method includes determining a stride value for stride access by referring to a size of two-dimensional (2D) data, and allocating neighboring data in a vertical direction of the 2D data to a plurality of banks that are different from one another according to the determined stride value. Thus, the data in the vertical direction may be efficiently accessed by using a memory having a large data width.

12 Claims, 10 Drawing Sheets

(51) Int. Cl.
*G06F 12/0886* (2016.01)
*G06F 12/02* (2006.01)

(52) U.S. Cl.
CPC .... *G06F 12/0886* (2013.01); *G06F 2212/621* (2013.01); *Y02D 10/13* (2018.01)

(56) References Cited

U.S. PATENT DOCUMENTS

| | | |
|---|---|---|
| 5,111,389 A | 5/1992 | McAuliffe et al. |
| 5,749,089 A | 5/1998 | Yoshizawa et al. |
| 6,125,432 A | 9/2000 | Hanami et al. |
| 6,381,668 B1 | 4/2002 | Lunteren |
| 6,748,480 B2 | 6/2004 | Chudnovsky et al. |
| 7,872,657 B1 | 1/2011 | Edmondson et al. |
| 8,370,603 B2 | 2/2013 | Toelkes et al. |
| 2004/0006667 A1 | 1/2004 | Bik et al. |
| 2004/0093457 A1 | 5/2004 | Heap |
| 2006/0236072 A1 | 10/2006 | Lyon |
| 2010/0312945 A1 | 12/2010 | Hutson |
| 2011/0087821 A1 | 4/2011 | Seo et al. |
| 2012/0092356 A1 | 4/2012 | Jiao |

FOREIGN PATENT DOCUMENTS

| | | |
|---|---|---|
| JP | 4635687 B2 | 2/2011 |
| KR | 10-2011-0098003 A | 8/2011 |
| WO | 0239271 A1 | 5/2002 |

OTHER PUBLICATIONS

Communication dated Jul. 11, 2017, from the European Patent Office in counterpart European Application No. 14877478.9.
Gene Golub et al. "Scientific Computing: An Introduction with Parallel Computing" Academic Press Inc., Feb. 3, 1993 (pp. 51-52).
Philip Koopman "Main Memory Performance 18-548/15-548 Memory System Architecture" Oct. 21, 1998 (17 pages total).
Communication dated Jan. 23, 2018, from the European Patent Office in counterpart European Application No. 14877478.9.
Harvey G. Cragon "Memory Systems and Pipelined Processors" Jones & Barlett Learning, Dec. 2, 1996, (pp. 237-240) XP055438291.
Communication dated Jun. 1, 2018, issued by the State Intellectual Property Office of the People's Republic of China in counterpart Chinese Patent Application No. 201480071840.5.

| bank num | B0 | B1 | B2 | B3 | B4 | B5 | B6 | B7 | | | | |
|---|---|---|---|---|---|---|---|---|---|---|---|---|
| bank addr 0 | (0,0)~(0,7) | (0,8)~(0,15) | | (1,0)~(1,7) | (1,8)~(1,15) | | (2,0)~(2,7) | (2,8)~(2,15) | | | | |
| 1 | | (3,0)~(3,7) | (3,8)~(3,15) | | (4,0)~(4,7) | (4,8)~(4,15) | | (5,0)~(5,7) | | | | |
| 2 | (5,8)~(5,15) | | (6,0)~(6,7) | (6,8)~(6,15) | | (7,0)~(7,7) | (7,8)~(7,15) | | | | | |
| 3 | | | | | | | | | | | | |
| 4 | | | | | | | | | | | | |
| 5 | | | | | | | | | | | | |
| 6 | | | | | | | | | | | | |
| 7 | | | | | | | | | | | | |

STRIDE 24  STRIDE 24

[Fig. 8]

| bank num | B0 | B1 | B2 | B3 | B4 | B5 | B6 | B7 | | |
|---|---|---|---|---|---|---|---|---|---|---|
| bank addr 0 | (0,0)~(0,7) | (0,8)~(0,15) | | (1,0)~(1,7) | (1,8)~(1,15) | | (2,0)~(2,7) | (2,8)~(2,15) | | |
| 1 | | (3,0)~(3,7) | (3,8)~(3,15) | | (4,0)~(4,7) | (4,8)~(4,15) | | (5,0)~(5,7) | | |
| 2 | (5,8)~(5,15) | | (6,0)~(6,7) | (6,8)~(6,15) | | (7,0)~(7,7) | (7,8)~(7,15) | | | |
| 3 | | | | | | | | | | |
| 4 | | | | | | | | | | |
| 5 | | | | | | | | | | |
| 6 | | | | | | | | | | |
| 7 | | | | | | | | | | |

STRIDE 24

MEMORY MANAGEMENT METHOD AND APPARATUS

TECHNICAL FIELD

One or more embodiments of the present invention relate to a memory management method and apparatus.

BACKGROUND ART

With the recent development of information and communication technologies, a variety of computer systems such as smart phones, digital cameras, digital TVs, etc. have been introduced. For an efficient use of a computer system, a high-speed processor is mounted on the computer system according to a user's demand. When a high-speed processor is mounted on a computer system, a high-speed memory controller for supporting high-speed performance is also required.

In general, a memory controller receives a memory access request, for example, a request for reading data from a memory, a request for writing data to a memory, etc., from various processing units, for example, a central processing unit (CPU), a graphic accelerator, etc. in the computer system, and processes a received memory access request. For example, the memory controller may receive a data load request from a CPU, read data from a memory according to a received data load request, and return the read data to a processor.

DISCLOSURE OF INVENTION

Solution to Problem

One or more embodiments of the present invention include a memory management method by which data in a vertical direction may be efficiently accessed by using a memory having a large data width.

One or more embodiments of the present invention include a memory management method which may reduce inefficient power consumption that may occur when using a memory having a large data width.

Additional aspects will be set forth in part in the description which follows and, in part, will be apparent from the description, or may be learned by practice of the presented embodiments.

According to one or more embodiments of the present invention, a memory management method includes determining a stride value for stride access by referring to a size of two-dimensional (2D) data, and allocating neighboring data in a vertical direction of the 2D data to a plurality of banks that are different from one another according to the determined stride value.

According to one or more embodiments of the present invention, a memory management method includes receiving a stride access request for neighboring data in a vertical direction that are stored in a plurality of banks that are different from one another, loading the neighboring data in the vertical direction from each of the plurality of banks that are different from one another according to a bank address corresponding to a received stride access request, and storing, in a cache, data that is stored in each of the plurality of banks that are different from one another and corresponds to the bank address, while outputting loaded data.

According to one or more embodiments of the present invention, a memory management apparatus for managing data of a memory configured with a plurality of banks includes determining a stride value for stride access by referring to a size of two-dimensional (2D) data, and allocating neighboring data in a vertical direction of the 2D data to the plurality of banks that are different from one another according to the determined stride value.

According to one or more embodiments of the present invention, a non-transitory computer readable recording medium have instructions, which, when executed by a computer, perform the above method.

MODE FOR THE INVENTION

Reference will now be made in detail to embodiments, examples of which are illustrated in the accompanying drawings, wherein like reference numerals refer to like elements throughout and thus their description will not be repeated. In this regard, the present embodiments may have different forms and should not be construed as being limited to the descriptions set forth herein. Accordingly, the embodiments are merely described below, by referring to the figures, to explain aspects of the present description.

The terms such as "first" and "second" are used herein merely to describe a variety of constituent elements, but the constituent elements are not limited by the terms. The terms are used only for the purpose of distinguishing one constituent element from another constituent element.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

Figure 1:
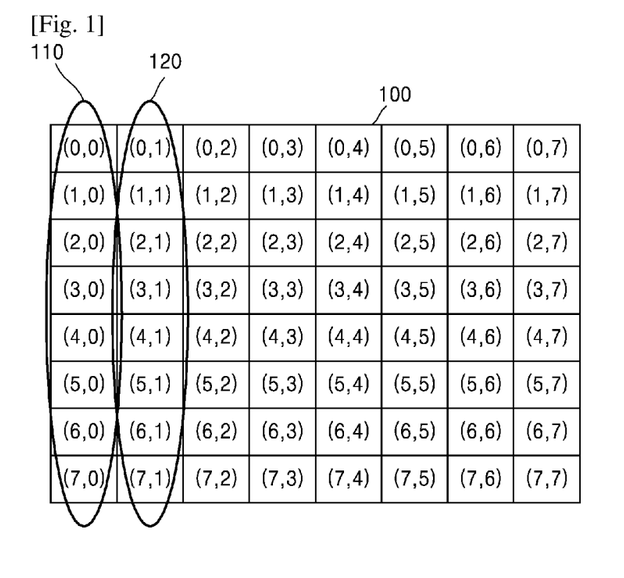
FIG. 1 illustrates an example of 8×8 two-dimensional (2D) data.
Figure 2:
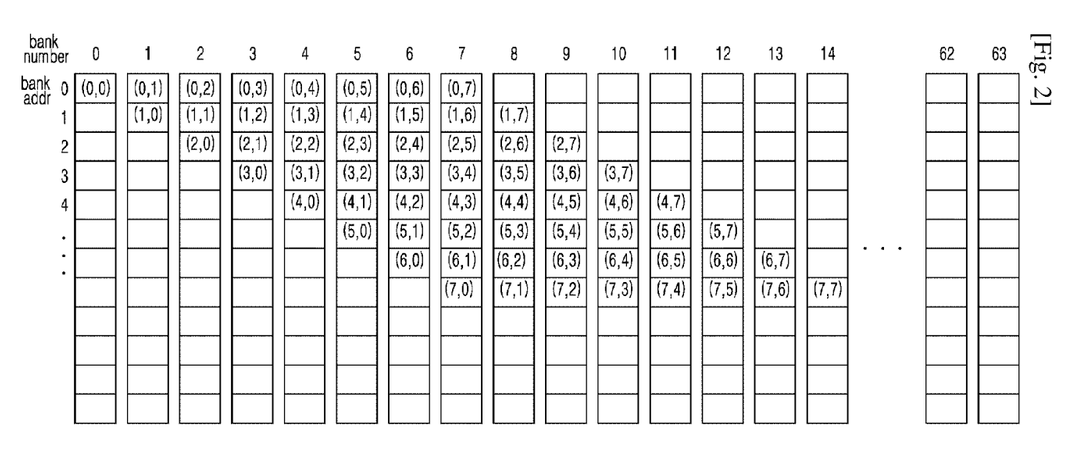
FIG. 2 illustrates an example of a bank for stride access of the 8×8 2D data of FIG. 1.
Figure 3:
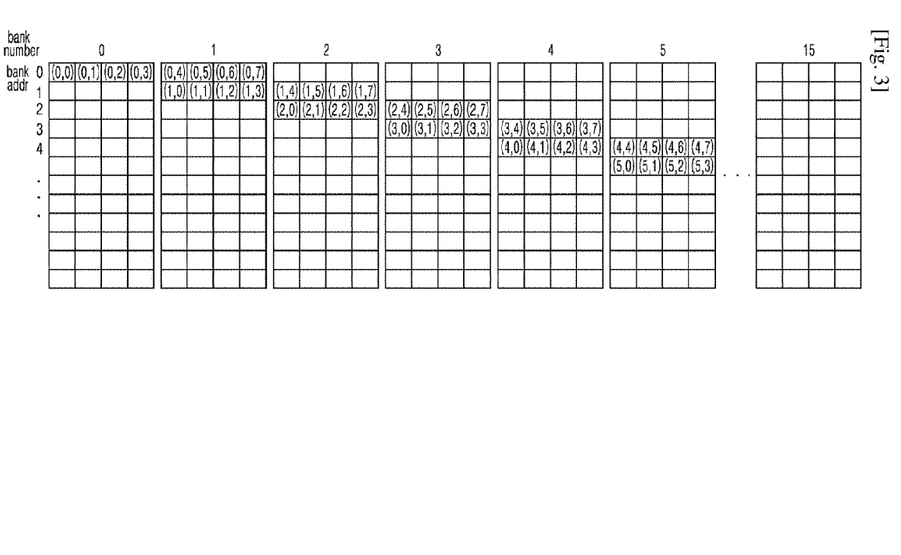
FIG. 3 illustrates another example of a bank for stride access of the 8×8 2D data of FIG. 1.

FIG. 1 illustrates an example of 8×8 two-dimensional (2D) data. FIG. 2 illustrates an example of a bank for stride access of the 8×8 2D data of FIG. 1. FIG. 3 illustrates another example of a bank for stride access of the 8×8 2D data of FIG. 1. Referring to FIGS. 1?3, stride access is described.

In many image algorithms, processing in a vertical or horizontal direction is needed for processing data of an image. Vector processing is used as a solution to enable fast image processing. For single instruction multiple data (SIMD), in which multiple data are processed with a single instruction, vector processing is used so that performance of a system may be improved.

Referring to FIG. 1, when an algorithm is performed such that 8×8 2D data 100 is processed in a horizontal direction, an operation performed on data in a first column 110 in FIG. 1 is the same as an operation performed on data in a second column 120, although the data in the first column 110 is in a different row of the 8×8 2D data than the data in the second column 120. Accordingly, the data, for example, data of the first column 110, that is, (0,0), (1,0), (2,0), (3,0), (4,0), (5,0), (6,0), and (7,0), are simultaneously processed by using vector processing. In doing so, a function in which data that is discontinuously stored in a memory (not shown) is read in a vertical direction is needed to read, at the same time, the data in a column to be processed. The function of reading data in the vertical direction is referred to as stride access. A variety of methods are used to read data at the same time that are discontinuously stored in the memory. A typical method is to allocate data in the same column to different memories or banks. In this description, data may be image data and may be stored in the memory in two dimensions. Also, the 2D data is not limited to image data and may be various types of data that are processed by a processor. When the data is image data, data corresponding to the positions of (0,0), (1,0), (2,0), (3,0), etc. may be pixel data.

As illustrated in FIG. 2, a bank may be configured by using a memory that matches a bit width of data. Eight (8) pieces of data in the vertical direction in the first column 110 of the 8×8 2D data 100 in FIG. 1 are respectively stored in bank 0 to bank 7. Eight (8) pieces of data in the vertical direction in the second column 120 of the 8×8 2D data 100 in FIG. 1 are respectively stored in bank 1 to bank 8. The data in eight (8) columns are stored in different banks in the same manner. Accordingly, neighboring data in the vertical direction, that is, pieces of data that neighbor each other in the vertical direction, for example, (0,0) and (1,0), may be stored in different banks, for example, bank 0 and bank 1. Thus, the neighboring data in the vertical direction, for example, (0,0) to (7,0), may be loaded at the same time from banks 0 to 7 through bank addresses 0 to 7. In the above memory system, a memory system is configured by collecting banks having a data width of about 1 to 2 bytes according to a bit width of data. The banks illustrated in FIG. 2 each have a small bit width and thus a large number of memory modules or banks are required. However, for memories having the same capacity, if the number of banks increases, area efficiency of a memory system is degraded and thus the size of the memory system is increased.

Referring to FIG. 3, when a bank with a large data width is used to achieve the above-described area efficiency, a memory system may be configured by using a smaller number of banks than that used in the memory system of FIG. 2. In other words, while sixty-two (64) banks are used in the example illustrated in FIG. 2, sixteen (16) banks are used in the example illustrated in FIG. 3. Accordingly, the overall size of the memory system is decreased, compared to the example of FIG. 2. However, since the bit width of a bank is increased, power consumption when accessing the bank is also increased. Also, although four pieces of data exist for each bank and thus four columns may be simultaneously read from the memory, only one column may be stored in a destination register at the same time. Accordingly, since the memory needs to be accessed each time to read data corresponding to columns 0 to 3 of the memory, that is, the data starting with (0,0) to (0,3), illustrated in FIG. 3, power consumption is increased further. However, for stride access in a method described later, that is, when the neighboring data in a vertical direction is loaded, inefficient power consumption that may result when using a bank having a large data width may be avoided. To this end, the number of memory accesses may be reduced by using a register type cache for storing memory data. When the number of memory accesses is reduced, bank conflicts in which different load/store units of the processor access the same bank are prevented so that overall performance may be improved. Also, a memory management method to read data in a vertical direction by using a memory having a large data width may be provided. To efficiently use the memory, a method for determining a storage interval, that is, a distance between banks, for storing neighboring data according to the size of 2D data is provided.

Figure 4:
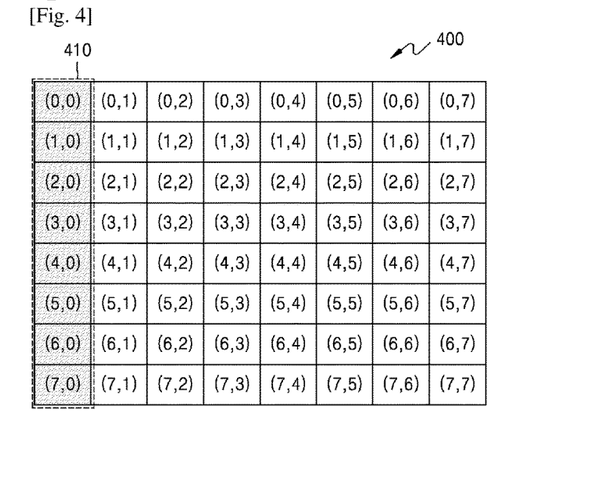
FIG. 4 illustrates an example of 8×8 2D data for stride access according to an embodiment.

FIG. 4 illustrates an example of 8×8 2D data 400 for stride access according to an embodiment. Referring to FIG. 4, a first column 410 of the 8×8 2D data 400 are illustrated. The data of the first column 410 are (0,0) to (7,0). The data of the first column 410 are neighboring data in a vertical direction, and the same operation is performed on the neighboring data when the processor performs vector processing. Although the size of the 2D data 400 is illustrated to be 8×8, the present embodiment is not limited thereto and any size, for example, 16×16, 64×64, etc., may be employed.

Figure 5:
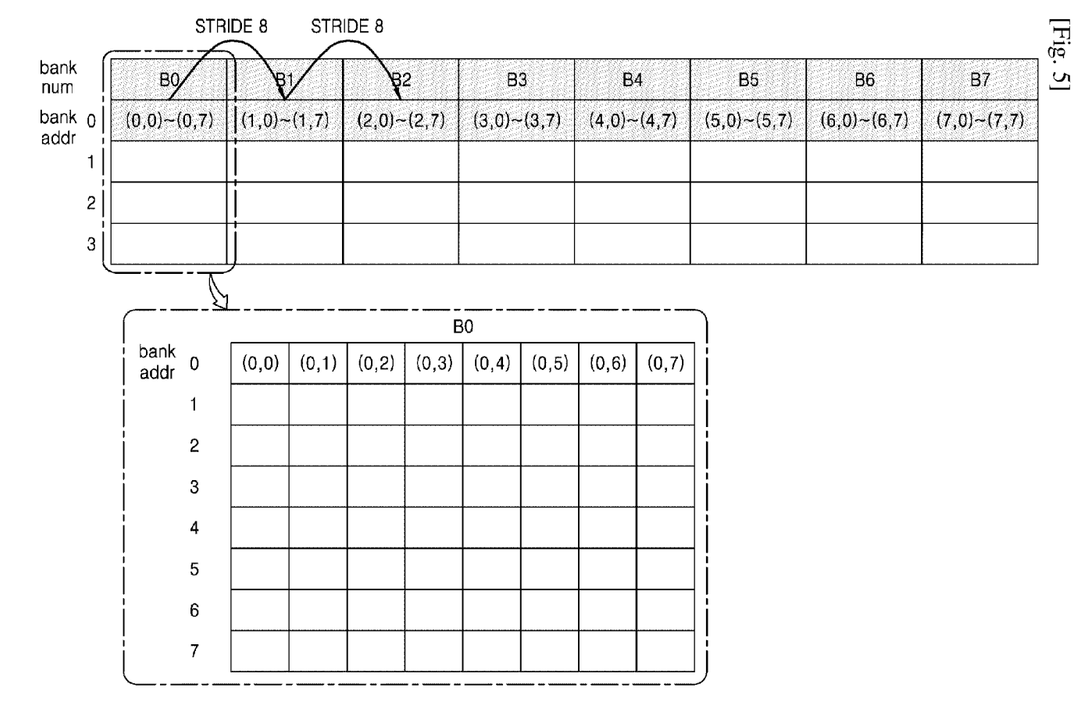
FIG. 5 is for describing a method for determining a stride value for 8×8 2D data according to an embodiment.

FIG. 5 is for describing a method for determining a stride value for 8×8 2D data according to an embodiment. Referring to FIG. 5, eight (8) banks B0 to B7 are illustrated. The number of banks is equal to 2N, where N is a natural number. The maximum number of data in the vertical direction that may be read at the same time and the number of banks may be identical to each other. As illustrated in FIG. 4, the maximum number of data in the vertical direction for stride access is 8, that is, (0,0) to (7,0). Accordingly, the number of banks necessary for storing the data is 8, that is, B0 to B7. When the bank has a data width for storing data of 2n, where n is 2, 3, 4, . . . , all data in the vertical direction are allocated to different banks to load the data in the vertical direction at the same time. The stride value may be defined by Equation 1.

Stride value=$a \times 2n$, where "$n$" is a positive odd number [Equation 1]

The stride value is determined to satisfy the condition of Equation 2.

Stride value=$a \times 2n \geq$ the number of columns of 2D data [Equation 2]

In Equation 2, "a" is a smallest positive odd number, "2n" is a bank width, and "n" is a natural number.

The stride value is a distance between data located in a row and data located in an adjacent row in the same column. In column 410 of FIG. 4, the stride value is a distance between the neighboring data in the vertical direction, for example, (0,0) and (1,0). For example, when a bank has a data width of 23=8 for storing data, the stride value may satisfy a×8, where "a" is an odd number. Accordingly, since the 2D data illustrated in FIG. 4 consists of eight (8) columns, a value of 1 is selected for "a" in Equation 2 so that the stride value is 8. Accordingly, as illustrated in FIG. 5, while data (0,0) to (0,7) are allocated to bank 0, data (1,0) to (1,7) are allocated to bank 1 and data (2,0) to (2,7) are allocated to bank 3 with a difference in the stride value equivalent to 8. As a result, the neighboring data (0,0) to (7,0) in the vertical direction are allocated to different banks B0 to B7 for vector processing. When the processor performs vector processing, the data (0,0) to (7,0) in the vertical direction may be accessed at the same time to banks 0 to 7 with a bank address "bank addr 0" so that all necessary data may be loaded. Also, when the processor not only loads data for image processing but also stores data to the memory after performing the image processing, data may be accessed at the same time.

Figure 6:
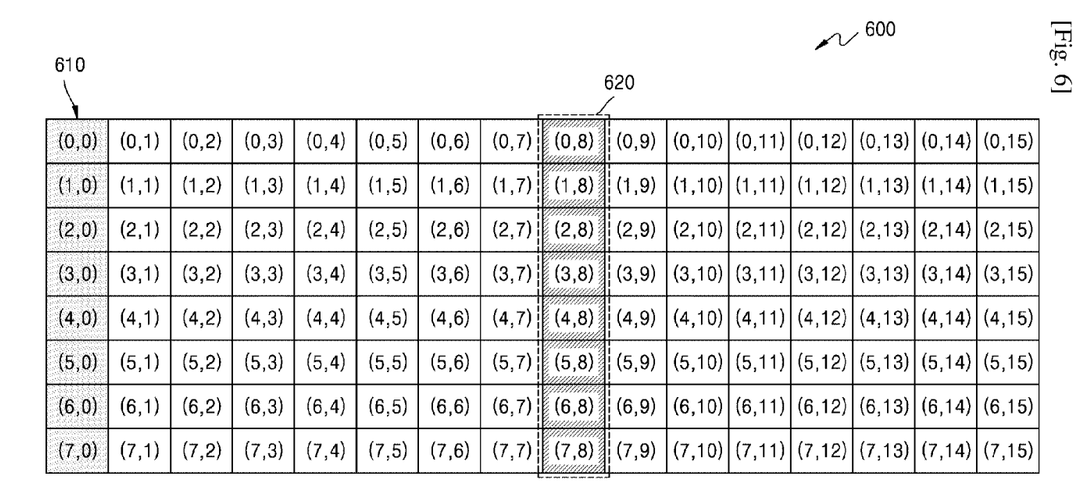
FIG. 6 illustrates 16×8 2D data for stride access according to another embodiment.
Figure 7:
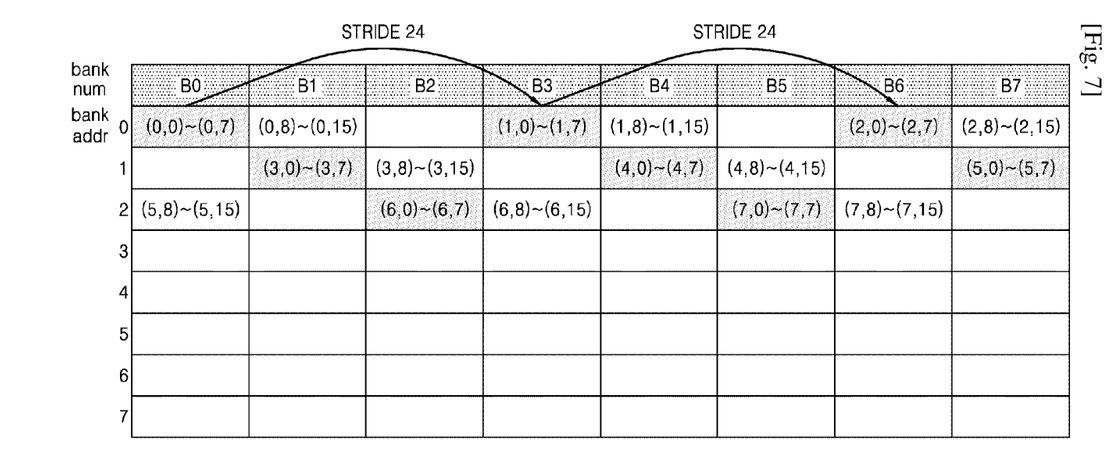
FIGS. 7 and 8 are for describing a method for determining a stride value for 16×8 2D data according to another embodiment.
Figure 8:
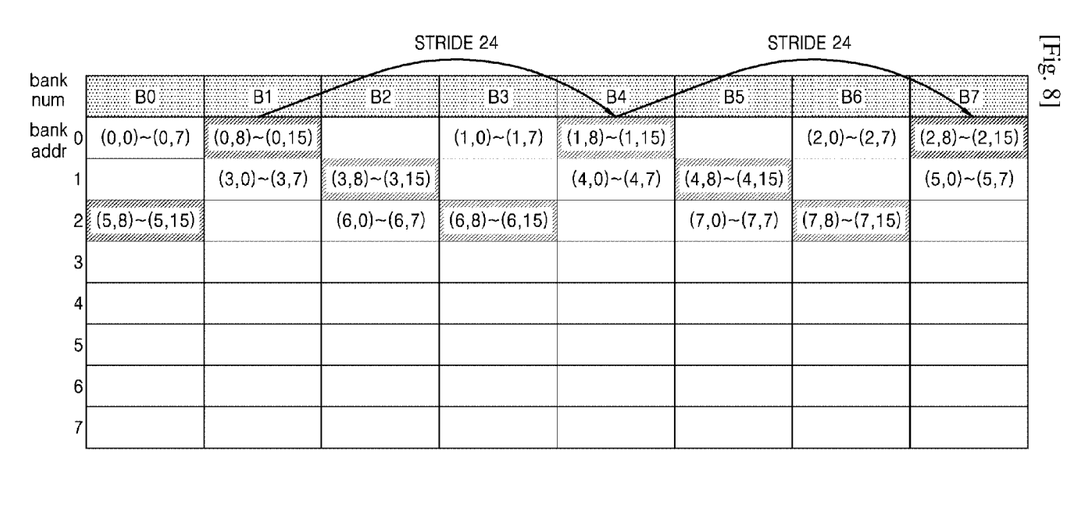

FIG. 6 illustrates an example of 16×8 2D data 600 for stride access according to another embodiment. FIGS. 7 and 8 are for describing a method for determining a stride value for 16×8 2D data according to another embodiment.

Referring to FIG. 6, a first column 610 and a ninth column 620 in the 16×8 2D data 600 are illustrated. The data of the first column 610 are (0,0) to (7,0) and the data of the ninth column 620 are (0,8) to (7,8). Since the maximum number of data in the vertical direction to be read at the same time is 8 according to Equations 1 and 2, the number of banks is 8.

As illustrated in FIG. 6, since the 16×8 2D data 600 is 2D data consisting of sixteen (16) columns, when Equation 2 is applied, an inequality that a×8≥16 is satisfied. Accordingly, since the smallest positive odd number "a" that satisfies the inequality is 3, a stride vale is 24. Thus, when 2D data having nine (9) to twenty-four (24) columns is stored in a memory bank, the odd number "a" that satisfies Equation 2 is 3, and thus a stride value is 24. The determination of a stride value according to Equations 1 and 2 may be expressed by Table 1.

TABLE 1

| Macro Block column size | | Stride value |
|---|---|---|
| min | max | |
| 1 | 8 | 8 |
| 9 | 24 | 24 |
| 25 | 40 | 40 |
| 41 | 56 | 56 |
| 57 | 72 | 72 |

Referring to Table 1, when the 2D data has a column size of 1 to 8, the stride value is set to 8, and when the 2D data has a column size of 9 to 24, the stride value is set to 24. Accordingly, when data to be processed or already processed is loaded from the memory or stored in the memory according to stride access, the data is allocated to different banks according to a stride value that is determined according to the size of 2D data so that the data may be loaded or stored with respect to the memory simultaneously or at the same time.

FIG. 7 shows a result of storing the data in banks B0 to B7 according to the stride value of 24 that is determined with reference to Equations 1 and 2 and Table 1. The number of rows of data among the 2D data is unrelated to the determination of a stride value.

Referring to the rows and columns of FIG. 6 and the banks of FIG. 7, data (0,0) to (0,7) in the first row are allocated to bank 0 B0, and data (1,0) to (1,7) in the second row are allocated to bank 3 B3 by skipping two (2) banks after bank 0 B0, the two (2) banks each having a data width of 8 according to the stride value of 24. The stride value of 24 is a data width between the first data (0,0) and the data (1,0) neighboring the first data (0,0) in the vertical direction. Accordingly, as the first data (0,0) is allocated to the first position in bank 0 B0 and the data (1,0) is allocated to the first position in bank 3 B3, neighboring data are stored to be separated by the stride value of 24 and allocated to different banks B0 and B3. Next, data (2,0) to (2,7) in the third row are allocated to bank 6 B6, and data (3,0) to (3,7) in the fourth row are allocated to bank 1 B1 by skipping two (2) banks after bank 6 B6, the (2) banks each having a data width of 8 according to the stride value of 24. Data (4,0) to (4,7) in the fifth row are allocated to bank 4 B4, and data (5,0) to (5,7) in the sixth row are allocated to bank 7 B7. Data (6,0) to (6,7) in the seventh row are allocated to bank 2 B2, and data (7,0) to (7,7) in the eighth row are allocated to bank 5 B5. In the above manner, all data (0,0) to (7,0) of the first column 610 of FIG. 6 are allocated to different banks B0 to B7. Accordingly, when vector processing of the data (0,0) to (7,0), that is, the neighboring data in the vertical direction, is needed, the processor may access the memory through bank addresses addr 0, addr 1, and addr 2 to load or store the necessary data (0,0) to (7,0) simultaneously or at the same time. According to the above memory management method, since the neighboring data in the vertical direction are stored in different banks according to stride access, a function of reading the data at the same time may be maintained and memory may be efficiently used. Also, since the banks used each have a large data width, the number of banks may be reduced and the area efficiency may be improved.

Referring to FIG. 8, data (0,8) to (7,8) in the ninth column 620 of FIG. 6 are allocated to banks. Data (0,8) to (0,15) in the first row are allocated to bank 1 B1, and data (1,8) to (1,15) in the second row are allocated to bank 4 B4 by skipping two (2) banks after bank 1 B1, the two (2) banks each having a data width of 8 according to the stride value of 24. The stride value of 24 is a data width between the first data (0,8) and the data (1,8) neighboring the first data (0,8) in the vertical direction. Next, data (2,8) to (2,15) in the third row are allocated to bank 7 B7. Data (3,8) to (3,15) in the fourth row are allocated to bank 2 B2. Data (4,8) to (4,15) in the fifth row are allocated to bank 5 B5. Data (5,8) to (5,15) in the sixth row are allocated to bank 0 B0. Data (6,8) to (6,15) in the seventh row are allocated to bank 3 B3. Data (7,8) to (7,15) in the eighth row are allocated to bank 6 B6. In the above manner, all data (0,8) to 7,8) of the eighth column 620 of 6 are allocated to different banks B0 to B7. Accordingly, when vector processing of the data (0,8) to 7,8, that is, the neighboring data in the vertical direction, is needed, the processor may access the memory through the bank addresses addr 0, addr 1, and addr 2 to load or store the necessary data (0,8) to (7,8) simultaneously or at the same time.

Figure 9:
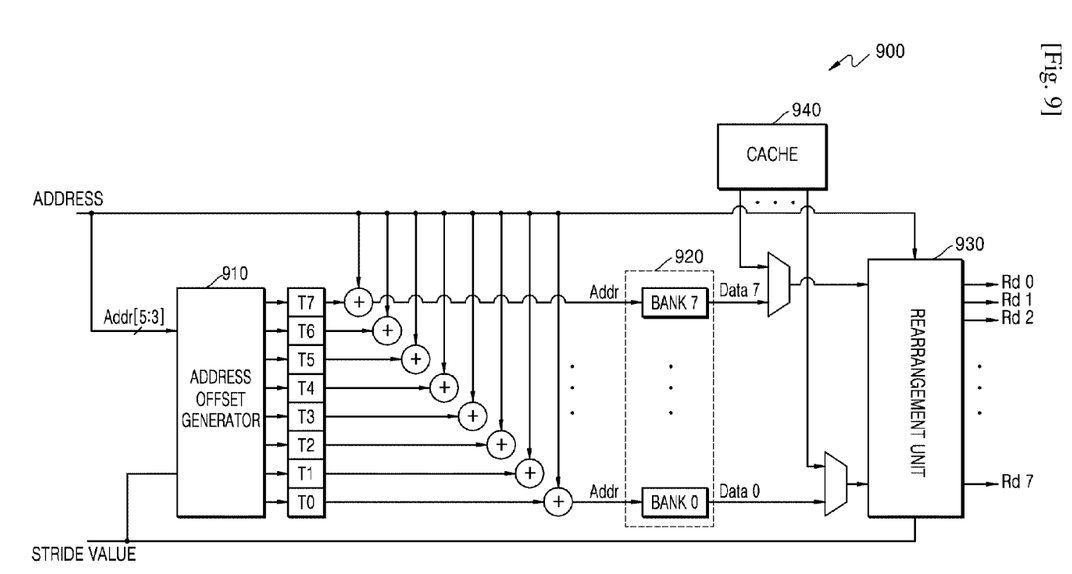
FIG. 9 is a processing block diagram for illustrating a memory management method according to an embodiment.

FIG. 9 is a processing block diagram for illustrating a memory management method according to an embodiment. Referring to FIG. 9, a memory management apparatus 900 according to the present embodiment includes an address offset generator 910, a memory 920 including 0th to 7th banks, a rearrangement unit 930 for rearranging data loaded from the memory 920, and a cache 940.

The bank addresses vary according to the position of a column from which data will be loaded as illustrated in FIGS. 6 to 8. As illustrated in FIGS. 7 and 8, the data (0,0) is allocated to bank 0 B0 and the data (0,8) is allocated to bank 1 B1. Since the number of banks at the position of the first data to be accessed is 8, a total of eight (8) cases may be possible. The bank and address vary for each case.

The address offset generator 910 generates an offset value according to the stride value and the bank of the first data in order to generate each bank address. An address for each bank is calculated by adding the offset value to a base address that is a bank address of a start bank.

Referring back to FIG. 7, since a bank to which the first data is allocated is bank 0 B0 and a bank address of bank 0 B0 is 0, a base address is 0. Also, the offset value of bank 1 B1 is 1, the offset value of bank 2 B2 is 2, the offset value of bank 3 B3 is 3, and the address of each bank is a sum of the base address and the offset value thereof. An address offset value of each bank that is determined by a corresponding stride value and a start bank that is the first bank is shown in Table 2.

TABLE 2

| STR | A[5:3] | T0 | T1 | T2 | T3 | T4 | T5 | T6 | T7 |
|---|---|---|---|---|---|---|---|---|---|
| 8 | 0 | 0 | 0 | 0 | 0 | 0 | 0 | 0 | 0 |
| 8 | 1 | 1 | 0 | 0 | 0 | 0 | 0 | 0 | 0 |
| 8 | 2 | 1 | 1 | 0 | 0 | 0 | 0 | 0 | 0 |
| 8 | 3 | 1 | 1 | 1 | 0 | 0 | 0 | 0 | 0 |
| 8 | 4 | 1 | 1 | 1 | 1 | 0 | 0 | 0 | 0 |
| 8 | 5 | 1 | 1 | 1 | 1 | 1 | 0 | 0 | 0 |
| 8 | 6 | 1 | 1 | 1 | 1 | 1 | 1 | 0 | 0 |
| 8 | 7 | 1 | 1 | 1 | 1 | 1 | 1 | 1 | 0 |
| 24 | 0 | 0 | 1 | 2 | 0 | 1 | 2 | 0 | 1 |
| 24 | 1 | 2 | 0 | 1 | 2 | 0 | 1 | 2 | 0 |
| 24 | 2 | 1 | 2 | 0 | 1 | 2 | 0 | 1 | 2 |
| 24 | 3 | 3 | 1 | 2 | 0 | 1 | 2 | 0 | 1 |
| 24 | 4 | 2 | 3 | 1 | 2 | 0 | 1 | 2 | 0 |
| 24 | 5 | 1 | 2 | 3 | 1 | 2 | 0 | 1 | 2 |
| 24 | 6 | 3 | 1 | 2 | 3 | 1 | 2 | 0 | 1 |
| 24 | 7 | 2 | 3 | 1 | 2 | 3 | 1 | 2 | 0 |
| 40 | 0 | 0 | 3 | 1 | 4 | 2 | 0 | 3 | 1 |
| 40 | 1 | 2 | 0 | 3 | 1 | 4 | 2 | 0 | 3 |
| 40 | 2 | 4 | 2 | 0 | 3 | 1 | 4 | 2 | 0 |
| 40 | 3 | 1 | 4 | 2 | 0 | 3 | 1 | 4 | 2 |
| 40 | 4 | 3 | 1 | 4 | 2 | 0 | 3 | 1 | 4 |
| 40 | 5 | 5 | 3 | 1 | 4 | 2 | 0 | 3 | 1 |
| 40 | 6 | 2 | 5 | 3 | 1 | 4 | 2 | 0 | 3 |
| 40 | 7 | 4 | 2 | 5 | 3 | 1 | 4 | 2 | 0 |
| 56 | 0 | 0 | 6 | 5 | 4 | 3 | 2 | 1 | 0 |
| 56 | 1 | 1 | 0 | 6 | 5 | 4 | 3 | 2 | 1 |
| 56 | 2 | 2 | 1 | 0 | 6 | 5 | 4 | 3 | 2 |
| 56 | 3 | 3 | 2 | 1 | 0 | 6 | 5 | 4 | 3 |
| 56 | 4 | 4 | 3 | 2 | 1 | 0 | 6 | 5 | 4 |
| 56 | 5 | 5 | 4 | 3 | 2 | 1 | 0 | 6 | 5 |
| 56 | 6 | 6 | 5 | 4 | 3 | 2 | 1 | 0 | 6 |
| 56 | 7 | 7 | 6 | 5 | 4 | 3 | 2 | 1 | 0 |
| 72 | 0 | 0 | 1 | 2 | 3 | 4 | 5 | 6 | 7 |
| 72 | 1 | 8 | 0 | 1 | 2 | 3 | 4 | 5 | 6 |
| 72 | 2 | 7 | 8 | 0 | 1 | 2 | 3 | 4 | 5 |
| 72 | 3 | 6 | 7 | 8 | 0 | 1 | 2 | 3 | 4 |
| 72 | 4 | 5 | 6 | 7 | 8 | 0 | 1 | 2 | 3 |
| 72 | 5 | 4 | 5 | 6 | 7 | 8 | 0 | 1 | 2 |
| 72 | 6 | 3 | 4 | 5 | 6 | 7 | 8 | 0 | 1 |
| 72 | 7 | 2 | 3 | 4 | 5 | 6 | 7 | 8 | 0 |

In Table 2, the value of A[5:3] represents a bank of the first data, column T0 is an address offset value of bank 0, and column T1 is an address offset value of bank 1.

The rearrangement unit 930 rearranges the order in which data, that is, data 0 to 7, is loaded from the memory 920 and outputs the data to the processor in order of Rd0 to Rd7. Referring back to FIG. 7, the banks corresponding to the data (7,0) at the lowermost of the first column 610 to the data (0,0) at the uppermost of the first column 610 among the neighboring data in the vertical direction are ordered {B5, B2, B7, B4, B1, B6, B3, B0} in FIG. 8. Also, as further illustrated in FIG. 8, the banks corresponding to the data (7,8) at the lowermost of the ninth column 620 to the data (0,8) at the uppermost of the ninth column 620 of FIG. 7 are ordered {B6, B3, B0, B5, B2, B7, B4, B1}. Accordingly, the output data needs to be rearranged so that the processor may perform vector processing of the output data in an order according to the data arrangement {(0,0), (1,0), (2,0), (3,0), (4,0), (5,0), (6,0), (7,0)} of the first column 610 of FIG. 6. For example, in FIG. 9, since the data loaded or read from bank 0 to bank 7 is arranged in an order {(0,0), (3,0), (6,0), (1,0), (4,0), (7,0), (2,0), (5,0)}, the rearrangement unit 930 rearranges the data, thereby changing the order, and outputs the output data in the order {(0,0), (1,0), (2,0), (3,0), (4,0), (5,0), (6,0), (7,0)}.

When a stride access request to access the neighboring data in the vertical direction stored in different banks is received and the neighboring data in the vertical direction is loaded from each bank according to the bank address of each bank, the cache 940 outputs the loaded data and stores the data stored in banks corresponding to the bank address.

In general, a lot of image algorithms perform iterative operations by using neighboring continuous data. As illustrated in FIG. 6, when data in column 0 610 of the 16×8 2D data 600 are processed, the data (0,1) to (7,1) of column 1 may be highly likely to be processed next. Accordingly, the number of memory accesses may be reduced by using a register type cache to use the characteristics in the vector processing.

Referring to FIGS. 1 and 3, when the vector processing is performed, a method for reducing the number of memory accesses by using cache is described.

The data of columns 0 to 7 of the 2D data 100 is stored in a bank having a data width of 4 by using a shift and rotate method, as illustrated in FIG. 3. The data (0,0) to (0,3) in the 0th row are allocated to bank 0 and the data (0,4) to (0,7) in the 1st row are allocated to bank 1. The data (1,0) to (1,3) in the 2nd row, which is the next row, are allocated to bank 1 and the data (1,4) to (1,7) in the 2nd row are allocated to bank 2. As the data (0,0) to (7,0) neighboring in the vertical direction are allocated to different banks in the above manner, the data may be loaded from the bank addresses 0 to 7 simultaneously or at the same time.

When the processor accesses column 0 110 to perform vector processing, for example, to perform an operation on the neighboring data in the vertical direction, that is, column 0, the data (0,0) to (0,3) of column 0 110, the data (1,0) to (1,3) of column 1 120, . . . , and the data (7,0) to (7,3) of column 7 via the memory through the bank addresses 0 to 7 in order to perform an operation thereon.

The processor performs vector processing on the data (0,0) to (7,0) of column 0 110 as loaded from the bank addresses 0 to 7. Among the loaded data (0,0) to (0,3) of bank 0, the data used for the vector processing is (0,0), and the other data (0,1) to (0,3) may be highly likely to be used for a next iteration of vector processing. Likewise, among the data (1,0) to (1,3) of bank 1, the data used for the vector processing is (1,0) and the other data (1,1) to (1,3) may be highly likely to be used for the next vector processing. As described above, since neighboring continuous data is highly likely to be processed in an image processing algorithm, the other data, which is likely to be processed next is stored in the cache 940. For the next vector processing, the memory is not accessed and the data stored in the cache 940 are used.

Referring back to FIGS. 6, 7, and 9, in order to load the data (0,0) to (7,0) of column 0 610 in FIG. 6, banks B0 to B7 which are shaded in FIG. 7 are assigned addresses. Bank 0 B0 is accessed by bank address 0 addr 0, bank 1 B1 is accessed by bank address 1 addr 1, bank 2 B2 is accessed by bank address 2 addr 2, bank 3 B3 is accessed by bank address 0 addr 0, bank 4 B4 is accessed by bank address 1 addr 1, bank 5 B5 is accessed by bank address 2 addr 2, bank 6 B6 is accessed by bank address 0 addr 0, and bank 7 B7 is accessed by bank address 1 addr 1. In this case, eight (8) pieces of data for each bank are output from the memory. The data (0,0) to (7,0) of column 0 610 are output and the data (0,0) to (7,7) of columns 0 to 7 are stored in the cache 940. In an example, when an address of neighboring data of a next column is received, data is not loaded from banks B0 to B7 of the memory 920 and the data stored in the cache 940 is output.

Thus, when a bank having a large data width is used for vector processing, the use of a cache according to the present embodiment may reduce the number of memory accesses and thus power consumption may be reduced and performance of the processor may be improved due to a reduction in the number of bank conflicts. Also, since a memory having a large data width may be used and the number of banks may be reduced, area efficiency may be improved. The cache in the present embodiment may be of a register type and may be present between the processor and an internal memory of a processor chip, but the present embodiment is not limited thereto.

Figure 10:
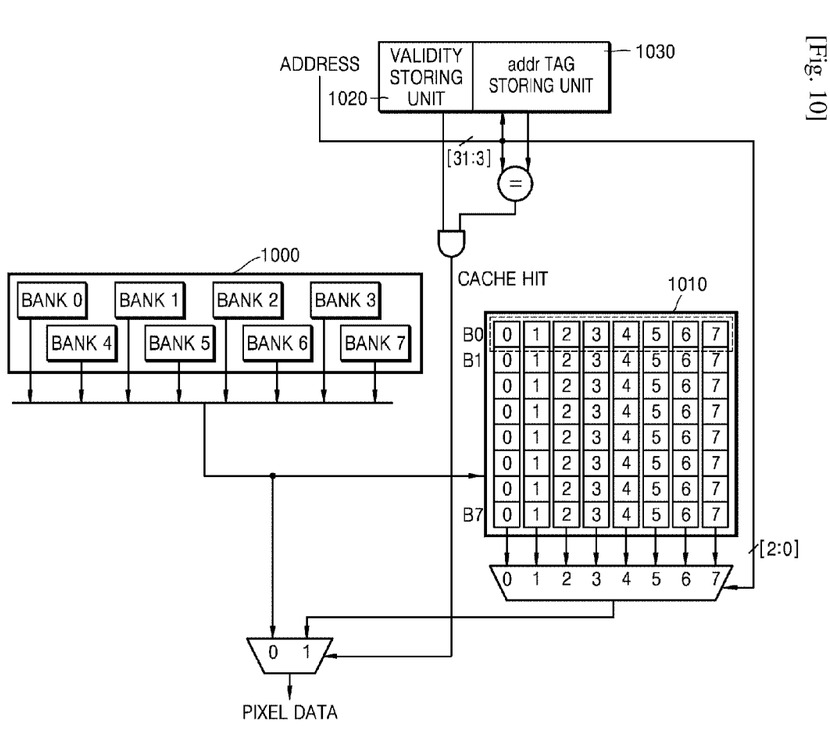
FIG. 10 is a processing block diagram for illustrating a memory management method including cache according to another embodiment.

FIG. 10 is a processing block diagram for illustrating a memory management method including cache according to another embodiment. Referring to FIG. 10, a memory 1000 including banks 0 to 7, a cache 1010 of a register type for storing 8×8 data, a validity value storing unit 1020 for storing validity of cache, and an address tag storing unit 1030.

As illustrated in FIGS. 6 and 7, in order to load the data of the column 0 610, all shaded banks are accessed according to the respective bank address of each bank. Bank 0 is accessed at bank address 0, bank 1 is accessed at bank address 1, . . . , and bank 7 is accessed at bank address 7. When eight (8) pieces of data are output for each bank, data of column 0 is output and simultaneously data corresponding to columns 0 to 7 are stored in the cache 1010. The cache 1010 stores data of bank 0 to bank 7.

In this case, since valid data are stored in the cache 1010, validity values of the valid data stored in the cache 1010 are stored in the validity value storing unit 1020 and a bank address corresponding to the valid data stored in the cache 1010) is stored in the address tag storing unit 1030 as an address tag.

Next, when a stride access is requested, the bank address at the time of the request is compared with the address tag stored in the address tag storing unit 1030. When the validity of cache is set in the validity storing unit 1020 and a bank address included in the next stride access request is the same as the stored address tag, data is output from the cache 1010 without accessing the memory 1000.

In the present embodiment, when valid data is stored in the cache 1010, since the memory 1000 is not accessed, other load/store units of the processor may access the memory 1000, and thus the number of bank conflicts may be reduced and system performance may be improved. Also, although FIG. 10 illustrates that the size of the cache 1010 is able to store 8×8 2D data, the present embodiment is not limited thereto and the cache 1010 may be embodied to have a variety of sizes according to the number of banks and the data width of each bank. Also, although the cache 1010 may be embodied as a register existing between the processor and an internal memory, the present embodiment is not limited thereto.

Figure 11:
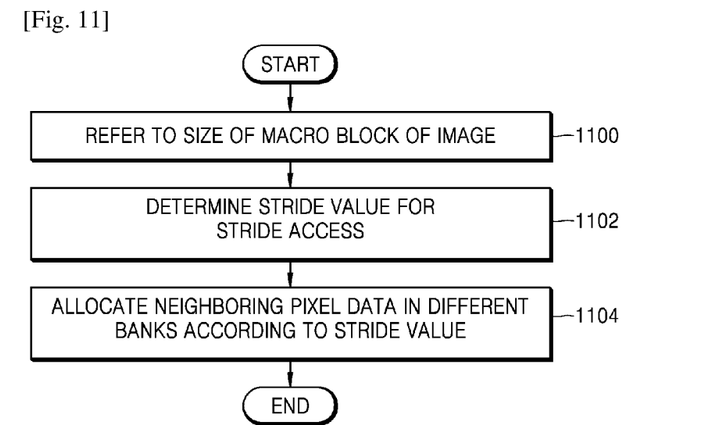
FIG. 11 is a flowchart for explaining a memory management method according to an embodiment.

FIG. 11 is a flowchart for explaining a memory management method according to an embodiment. Referring to FIG. 11, in operation 1100, the size of 2D data is referred to. The size of 2D data includes the number of columns. In operation 1102, a stride value for stride access is determined. According to a stride access request from the processor, a stride value appropriate for allocating neighboring data included among 2D data is determined according to the size of 2D data. When a bank has a data width capable of storing eight (8) pieces of data according to Equations 1 and 2, if the number of columns of the 2D data is 8, a stride value is determined to be 8. If the number of columns of the 2D data is 16, a stride value is determined to be 24 because a smallest positive odd number satisfying a condition in which a stride value of Equation 1 or 2 is greater than or equal to 16, i.e., the number of columns, is 3. As illustrated in Table 1, a stride value is determined according to a corresponding column size based on the minimum and maximum values of the column size of 2D data.

In operation 1104, the neighboring data are allocated to different banks according to the stride value. When the stride value determined in the operation 1102 is, for example, 8, a difference in the address where the neighboring data are stored in the vertical direction requiring stride access is 8, and thus the neighboring data are allocated to different banks. Accordingly, the processor may read the data stored in the banks simultaneously or at the same time according to each bank address.

Figure 12:
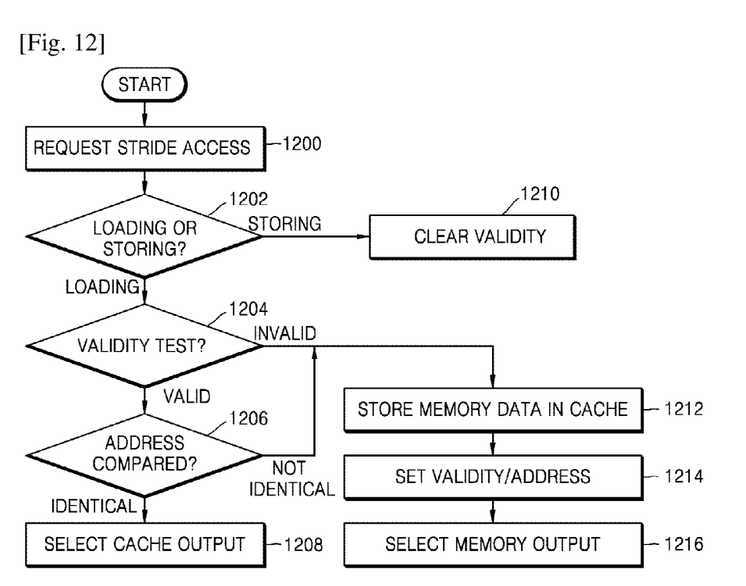
FIG. 12 is a flowchart for explaining a memory management method according to another embodiment.

FIG. 12 is a flowchart for explaining a memory management method according to another embodiment. Referring to FIG. 12, a stride access request is received in operation 1200. The stride access request may be a request by the processor to access and perform vector processing on neighboring data in the vertical direction.

In operation 1202, it is determined whether the stride access is for loading or storing. That is, it is determined whether the stride access is for loading the data stored in a memory or for storing the data processed by the processor. When the stride access is for storing, in operation 1210, validity of a cache is cleared. When the stride access is for storing, validity of a cache is cleared. When the stride access is for loading, in operation 1204, the validity of a cache is checked. When the cache is valid, addresses are compared with each other. When it is a stride access request for loading the data stored in the memory by the processor, whether there is data stored in the cache is determined with reference to the validity of a cache. When valid data are stored in the cache, an address tag of the data stored in the cache is compared with an address according to the current stride access request, in operation 1206

When the address tag and the received address are identical, in operation 1208, a cache output is selected. Accordingly, the data stored in the cache is output without accessing the memory. In the present embodiment, for vector processing, it is highly likely that, after the neighboring data in the vertical direction is processed, data neighboring the processed data is processed. For an address request for the neighboring data, the memory is not accessed and the data stored in the cache is output to the processor.

When the address tag and the received address are not identical, operation 1212 is performed. Also, when the cache is determined as being invalid in operation 1204, operation 1212 is performed. In operation 1212, memory data is stored in the cache. In operation 1214, validity and address are set. When the stride access request received from the processor is not a request for the neighboring data, data is loaded from the memory, the loaded data is stored in the cache, validity of the cache is set, and a corresponding address is stored as an address tag. In operation 1216, a memory output is selected. Thus, the data loaded from the memory is output to the processor.

Although it is illustrated that the processes of operations 1212 to 1216 are sequentially performed, the processes may be performed simultaneously or in an order such that operation 1216 is first performed, followed by the cache update process of the operations 1212 and 1214.

In the present embodiment, a stride value for stride access is determined according to the size of 2D data, for example, the size of a column of 2d data. Since data are allocated to different banks, neighboring data in the vertical direction all exist in different banks and thus, while maintaining a basic function of reading the data at the same time, a memory may be more efficiently used. Also, since the banks are configured by using a memory having a large data width, the number of banks may be reduced and area efficiency may be improved.

Furthermore, since a register type cache is used by utilizing stride access, for example, an image processing algorithm for reading the neighboring data in the vertical direction, the number of memory accesses may be reduced and thus power consumption may be reduced. Also, since memory accesses by other load/store units of the processor are allowed, bank conflict is reduced and thus overall system performance may be improved.

Furthermore, although the present embodiments describe a memory management method and apparatus for loading or storing data, the present embodiments are not limited to audio data or video data and may be applied to a variety of data loading/storing memory managements.

As described above, the memory management method according to the above embodiments may use a memory having a large data width so that data in the vertical direction may be efficiently accessed and thus inefficiency of power consumption may be reduced.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more micro-processors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. The words "mechanism" and "element" are used broadly and are not limited to mechanical or physical embodiments, but may include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". It will be recognized that the terms "comprising," "including," and "having," as used herein, are specifically intended to be read as open-ended terms of art.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

The invention claimed is:

1. A memory management method comprising:
   determining a stride value for stride access by referring to a size of two-dimensional (2D) data; and allocating neighboring data in a vertical direction of the 2D data to a plurality of banks that are different from one another according to the determined stride value, wherein the stride value is an odd multiple of a data width of the bank and the stride value is equal to or larger than a number of columns of the 2D data.

2. The memory management method of claim 1, wherein the stride value is determined to satisfy the following equation:

$$stride = a \times 2n \geq \text{the number of columns of the 2D data},$$

wherein "a" is the smallest possible positive odd number that satisfies the inequality, "2n" is a bank width, and "n" is a natural number.

3. The memory management method of claim 1, wherein, as the neighboring data are allocated to the plurality of banks that are different from one another, the neighboring data are simultaneously loaded or stored.

4. The memory management method of claim 1, wherein the stride value is a distance between the plurality of banks to which the neighboring data are allocated.

5. The memory management method of claim 1, wherein a maximum number of the neighboring data in the vertical direction that are available for stride access is equal to the number of the plurality of banks.

6. The memory management method of claim 1, further comprising generating an offset value of each of the plurality of banks according to a bank to which first data of the neighboring 2D data is allocated and the determined stride value.

7. The memory management method of claim 6, further comprising calculating an address of each of the plurality of banks by using one of the generated offset values.

8. The memory management method of claim 1, further comprising:
receiving a stride access request for the neighboring data allocated to the plurality of banks that are different from one another;
rearranging an order in which data is loaded from the different banks based on an address of each of the plurality of banks and the stride value; and
outputting rearranged data.

9. The memory management method of claim 8, further comprising:
storing the rearranged data in a cache and setting validity of the cache;
storing an address of each of the plurality of banks as an address tag; and
loading data from the cache when a next stride access request is received and the address of each of the plurality of banks that are different from one another is identical to the stored address tag.

10. The memory management method of claim 9, further comprising:
storing data corresponding to the address of each of the plurality of banks that are different from one another when the address of each of the plurality of banks that are different from one another is not identical to the stored address tag;
setting validity of the cache and storing the address of each bank as an address tag; and
selecting a memory output according to the next stride access request.

11. A memory management apparatus for managing data of a memory configured with a plurality of banks, the memory management apparatus comprising:
at least one processor; and
a program memory storing a program which causes the at least one processor to:
determine a stride value for stride access by referring to a size of two-dimensional (2D) data and allocate neighboring data in a vertical direction of the 2D data to the plurality of banks that are different from one another according to the determined stride value;
wherein the stride value is an odd multiple of a data width of the bank and the stride value is equal to or larger than a number of columns of the 2D data.

12. The memory management apparatus of claim 11, wherein the stride value is determined to satisfy the following equation:

$$stride = a \times 2n \geq \text{the number of columns of the 2D data},$$

wherein "a" is the smallest possible positive odd number that satisfies the inequality, "2n" is a bank width, and "n" is a natural number.

* * * * *